(12) United States Patent
Faber (10) Patent No.: US 8,755,359 B2
(45) Date of Patent: *Jun. 17, 2014

(54) SYSTEM AND METHOD FOR DYNAMIC RECEIVE DIVERSITY ALLOCATION

(75) Inventor: Christian Faber, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/297,909

(22) Filed: Nov. 16, 2011

(65) Prior Publication Data

US 2012/0063434 A1    Mar. 15, 2012

Related U.S. Application Data

(63) Continuation of application No. 12/048,385, filed on Mar. 14, 2008, now Pat. No. 8,085,734.

(51) Int. Cl.
*H04W 4/00* (2009.01)
*H04W 52/40* (2009.01)
*H04B 7/06* (2006.01)
*H04B 7/04* (2006.01)

(52) U.S. Cl.
CPC ............ *H04W 52/40* (2013.01); *H04B 7/0617* (2013.01); *H04B 7/04* (2013.01)
USPC ........................................ 370/334

(58) Field of Classification Search
USPC .............. 370/216, 217, 219, 220, 334, 395.2, 370/395.21; 445/63.1, 562.1, 279.1
See application file for complete search history.

(56) References Cited

U.S. PATENT DOCUMENTS

| | | | |
|---|---|---|---|
| 5,557,603 A | 9/1996 | Barlett et al. | |
| 6,560,443 B1 | 5/2003 | Vaisanen et al. | |
| 6,870,815 B2 | 3/2005 | McFarland et al. | |
| 7,190,974 B2 | 3/2007 | Efland et al. | |
| 7,251,459 B2 | 7/2007 | McFarland et al. | |
| 2004/0198420 A1 | 10/2004 | He et al. | |
| 2005/0227631 A1 | 10/2005 | Robinett | |

*Primary Examiner* — Dady Chery
(74) *Attorney, Agent, or Firm* — Slater & Matsil, L.L.P.

(57) ABSTRACT

A system and method for dynamic receive diversity allocation. A communications device comprises a first physical layer (PHY) unit, a second PHY unit, a first signal path coupled to a first antenna and to the first PHY unit, a switchable signal path coupled to a second antenna and switchably coupled to the first PHY unit and the second PHY unit, and a switch control unit coupled to the second antenna. The switch control unit dynamically generates a control signal used to switchably couple the second antenna to either the first PHY unit or the second PHY unit. The second antenna may be used to provided a needed transmit or receive antenna or an extra antenna for use in increasing diversity. Switching antennas reduces the total number of antennas and support hardware, such as digital processing hardware, for wireless communications standards having a high ratio of idle to busy time.

27 Claims, 7 Drawing Sheets

SYSTEM AND METHOD FOR DYNAMIC RECEIVE DIVERSITY ALLOCATION

This application is a continuation of U.S. patent application Ser. No. 12/048,385, entitled "System and Method for Dynamic Receive Diversity Allocation," filed on Mar. 14, 2008, which is hereby incorporated herein by reference.

TECHNICAL FIELD

The present invention relates generally to a system and a method for wireless communications, and more particularly to a system and a method for dynamic receive diversity allocation.

BACKGROUND

In an attempt to increase overall functionality, there may be a desire to implement a wireless communications device capable of transmitting and receiving using multiple wireless communications standards or a single wireless communications standard that transmits and receives over several different frequency bands. Such a wireless communications device may enable communications with a larger number of communications devices. The use of multiple frequency ranges may also lead to fewer conflicts (e.g., transmission collisions) due to a spreading of transmissions over the multiple frequency range. Each wireless communications standard supported by the wireless communications device may require its own set of hardware and software. Furthermore, the use of multiple frequency bands may further increase hardware requirements.

To increase the data rate of wireless communications devices, some wireless communications standards may allow for the transmitting and receiving of multiple independent data streams, with each independent data stream requiring its own antenna. For example, a wireless communications device transmitting and receiving three independent data streams will require at least three transmit antennas and three receive antennas.

Additionally, some wireless communications devices may make use of what is known as transmit and/or receive diversity. Transmit and/or receive diversity is when more antennas than needed are used to transmit and/or receive independent data streams. For example, a wireless transmitter may use three transmit antennas to transmit two independent data streams, where the wireless transmitter is required to use only two transmit antennas to transmit the two independent data streams. A wireless receiver may use two receive antennas to receive one data stream, where the receiver is required to use only one receive antenna to receive one data stream.

A communications device may be referred to as an N×M communications device, wherein N is the number of transmit antennas and M is the number of receive antennas, with N and M being integer numbers ranging from one (1) and up. When both N and M are greater than one (1), the communications device may be referred to as being a multiple input, multiple output (MIMO) communications device. MIMO communications systems are one example of wireless communications systems implementing both transmit and receive diversity.

Therefore, a communications device that is compliant to two or more wireless communications standards, each potentially capable of communicating using multiple independent data streams as well as transmit and/or receive diversity and over multiple frequency bands, may have a significant amount of hardware that may greatly increase its size, complexity, and cost.

Figure 1:
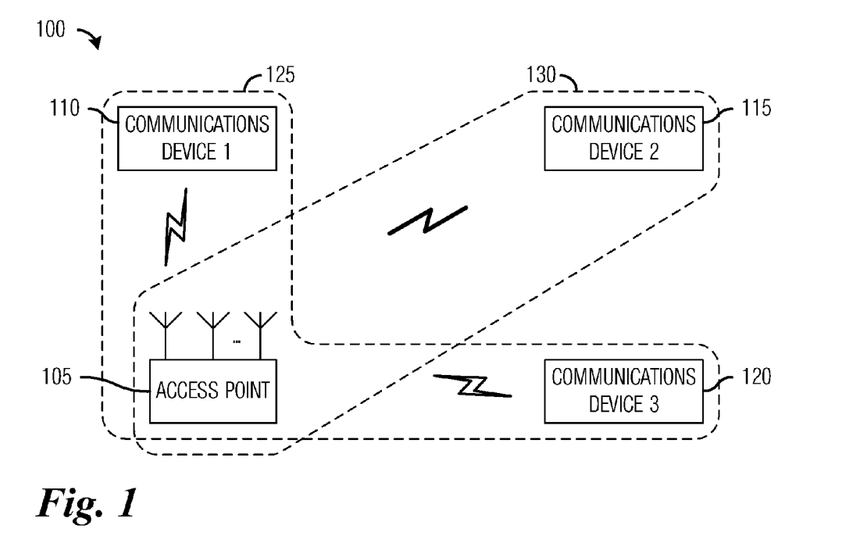
FIG. 1 is a diagram of a communications network.

FIG. 1 illustrates a communications network 100 including an access point 105, a first communications device "communications device 1" 110, a second communications device "communications device 2" 115, and a third communications device "communications device 3" 120. The access point 105 may be a special form of communications device, providing other communications device connectivity to other network resources, such as the Internet, proprietary networks, data servers, multimedia servers, and so forth.

The access point 105 may be capable of communicating using several different wireless communications standards. For example, the access point 105 may communicate with the first communications device 110 using a first wireless communications standard, the second communications device 115 using a second wireless communications standard, and the third communications device 120 using a third wireless communications standard. The first wireless communications standard and the third wireless communications standard may be compatible wireless communications standards and the access point 105, the first communications device 110, and the third communications device 120 may form a first wireless network 125. The second wireless communications standard may be incompatible with either the first wireless communications standard or the third communications standard and therefore, the access point 105 and the second communications device 115 may form a second wireless network 130 that is incompatible with the first wireless network 125.

Alternatively, the first wireless communications standard, the second wireless communications standard, and the third communications standard may be compatible with each other, but the first wireless communications standard and the third wireless communications standard transmits and receives over a first frequency band, while the second wireless communications standard transmits and receives over a second frequency band.

If the first wireless network 125 and the second wireless network 130 operate on different operating frequencies, then the access point 105 may not be able to share components, such as filters, switches, and so forth. Antennas may be shared but a more expensive antenna may be required.

SUMMARY OF THE INVENTION

These and other problems are generally solved or circumvented, and technical advantages are generally achieved, by preferred embodiments which provide a system and method for dynamic receive diversity allocation.

In accordance with an embodiment, a communications device is provided. The communications device includes a first physical layer (PHY) unit, a second PHY unit, a first signal path coupled to a first antenna and to the first PHY unit, a switchable signal path coupled to a second antenna and switchably coupled to the first PHY unit and to the second PHY unit, and a switch control unit coupled to the second antenna. The first PHY unit encodes, transmits, and receives data based on a first wireless communications specification, and the second PHY unit encodes, transmits, and receives data based on a second wireless communications specification. The first signal path performs processing on a signal in the first signal path, and the switchable signal path performs processing on a signal in the switchable signal path and switchably couples the second antenna to either the first PHY unit or the second PHY unit based on a control signal. The switch control unit generates the control signal to specify the coupling of the second antenna to either the first PHY unit or the second PHY unit.

The foregoing has outlined rather broadly the features and technical advantages of the embodiments in order that the detailed description of the embodiments that follows may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the invention. It should also be realized by those skilled in the art that such equivalent constructions do not depart from the spirit and scope of the embodiments as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an access point used to allow communication devices to communicate to other communications devices as well as access network resources, wherein the access point is compliant to two wireless communications standards or one wireless communications standard capable of communicating over two different frequency bands. According to an embodiment, the wireless communications standards are WLAN (wireless local area network) standards or WLAN sub standards such as IEEE 802.11a, b, g, n or different operation modes described in these standards. For example, according to one embodiment, the device may operate according to IEEE 802.11n in a 2.4 GHz frequency band (in a legacy mode) and may simultaneously operate in the IEEE 802.11n 5 GHz frequency band (in a MIMO mode). Furthermore, according to one embodiment the two different communications "standards" may be a legacy transmission mode (standard) such as IEEE 802.11a/b and a non-legacy "standard" such as IEEE 802.11n. The invention may also be applied to other devices, for example access points that are compliant with more than two wireless communications standards. In general, the invention may be applied to communications devices that are compliant with two or more wireless communications standards or one wireless communications standard utilizing two or more different frequency bands.

In general, to provide single antenna diversity to a communications device capable of communicating using two wireless communications standards, the communications device may need Nss1+1 antennas for a first wireless communications standard and Nss2+1 antennas for a second wireless communications standard, where Nss1 is a maximum number of independent data streams used in the first wireless communications standard and Nss2 is a maximum number of independent data streams used in the second wireless communications standard, or a total of Nss1+Nss2+2 antenna. For example, if Nss1=3 and Nss2=2, then the communications device may require seven (7) antennas.

Although the discussion focuses on a communications device capable of communicating using two wireless communications standards and uses a single antenna to provide diversity, the embodiments may be applicable to communications devices capable of communicating using more than two wireless communications standards and providing more than one antenna for diversity. Alternatively, the embodiments may also be applicable to communications devices capable of communicating using a single wireless communications standard that communicates over more than one different frequency band and provides one or more antennas for diversity. Therefore, the discussion of two wireless communications standards and single antenna for diversity should not be construed as being limiting to either the scope or the spirit of the embodiments.

Figure 2A:
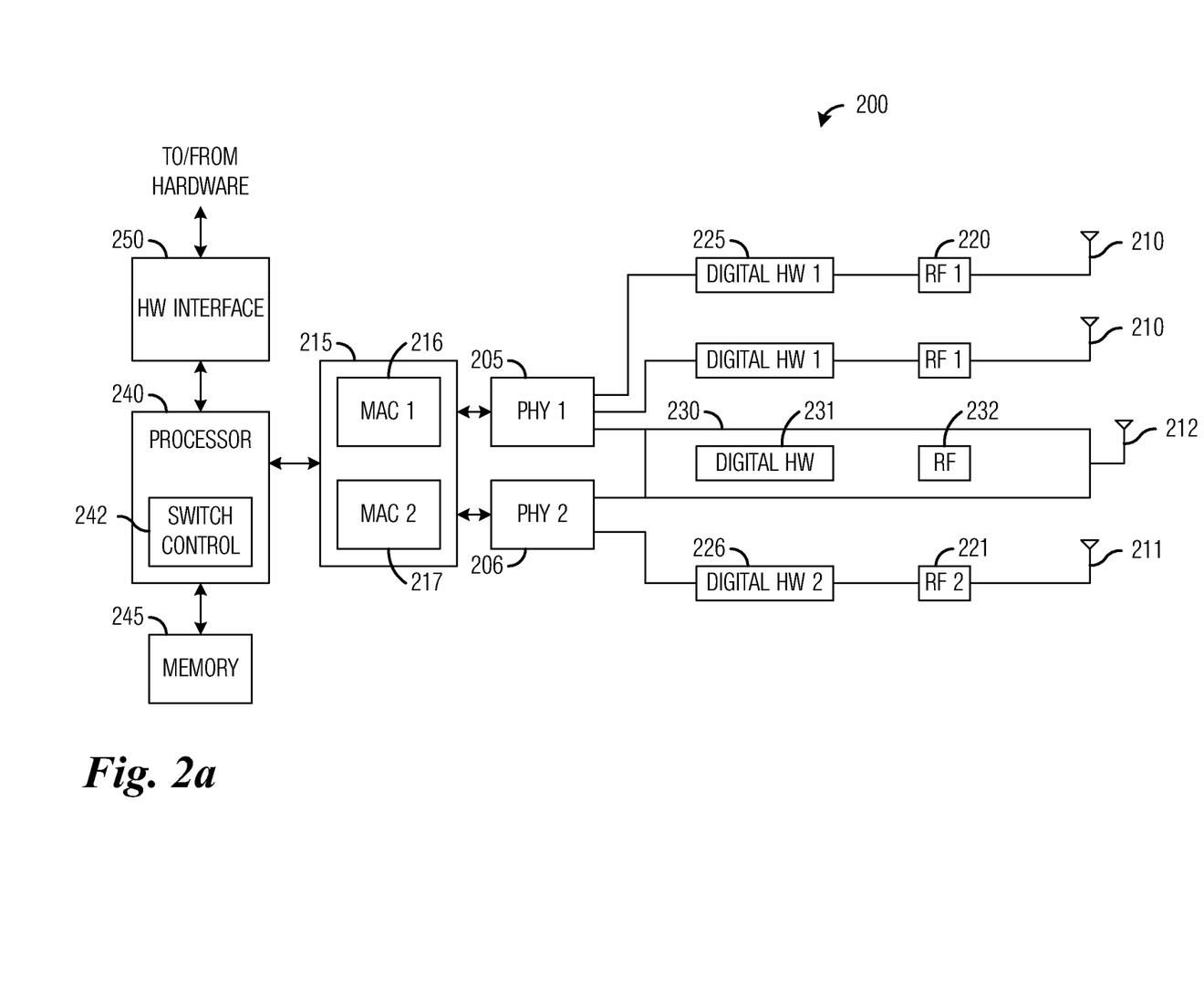
FIG. 2a is a diagram of a communications device.

With reference now to FIG. 2a, there is shown a diagram that illustrates a high-level view of a communications device 200, wherein the communications device 200 makes use of a shared antenna to reduce hardware requirements while providing compliance with wireless communications standards. The communications device 200 includes several physical (PHY) units, such as a first physical layer "PHY 1" unit 205 and a second physical layer "PHY 2" unit 206, implementing a first wireless communications standard and a second communications standard. In general, a PHY unit may process, such as filter, encode, decode, error detect, error correct, and so forth, data to be transmitted and/or received data. Although the first PHY unit 205 and the second PHY unit 206 may implement different wireless communications standards, the first PHY unit 205 and the second PHY unit 206 may also be used to enable communications using a single wireless communications standard over different frequency bands.

The communications device 200 also includes several antennas, such as antenna 210, antenna 211, and antenna 212. Some of the antennas may be dedicated for use with a given wireless communications standard, such as the antenna 210, which may be dedicated to the first wireless communications standard while other antennas, such as the antenna 212, may be used by more than one wireless communications standard. The antenna 212 may be referred to as being a shared antenna and may be shared between more than one PHY unit, such as the first PHY unit 205 and the second PHY unit 206, through the use of configurable switches, for example. The switching may be performed in hardware or software or combination of both.

The communications device 200 further includes a media access control (MAC) controller 215 that implements a first MAC "MAC 1" unit 216 and a second MAC "MAC 2" unit 217. Collectively, the first PHY unit 205 and the first MAC unit 216 may implement a first wireless communications standard, while the second PHY unit 206 and the second MAC unit 217 may implement a second wireless communications standard.

Between the antenna, such as the antenna 210, and a PHY unit, such as the first PHY unit 205, there may be a combination of digital and analog hardware. Analog hardware, shown in FIG. 2 as a first radio frequency (RF) "RF 1" unit 220, may include analog circuit components, such as filters, amplifiers, mixers, analog-to-digital converters, and so forth. Digital hardware, shown in FIG. 2 as a first digital hardware "DIGITAL HW 1" unit 225, may include digital circuit components such as filters, amplifiers, transforms (for example, Fourier transforms), digital-to-analog converters, and so forth. According to embodiments, the first digital hardware unit 225 may be a digital modulation unit provided to perform digital modulation functions for the receive and transmit signals such as a frequency-time (or time-frequency) conversion such as an inverse fast Fourier transform (iFFT) or a fast Fourier transform (FFT) circuit. Logically, it may be possible to include some or all of the above listed digital circuit components in the PHY unit. The first RF unit 220 and the first digital hardware unit 225 may include signal paths for signals leaving the communications device 200 (transmit signal path) and arriving at the communications device 200 (receive signal path). If the communications device 200 has more than one antenna dedicated to the first PHY unit 205, then the first RF unit 220 and the first digital hardware unit 225 may be replicated for each additional antenna dedicated to the first PHY unit 205.

Due to potential differences in wireless communications standards and/or frequency bands, such as operating frequency, signal power levels, coding schemes, signaling schemes, and so forth, analog hardware and/or digital hardware associated with the different wireless communications standards and/or frequency bands may be different. Therefore, a second RF unit 221 and a second digital hardware unit 226 may be different from the first RF unit 220 and the first digital hardware unit 225. According to embodiments, the second digital hardware unit 226 may be a digital modulation unit provided to perform digital modulation functions for the receiving and transmitting of signals such as a frequency-time (or time-frequency) conversion, such as an iFFT or a FFT circuit.

For an antenna shared between different PHY units, such as the antenna 212, a switchable signal path may be used to couple the antenna 212 to the different PHY units. For example, a switchable signal path 230 may be used to couple the antenna 212 selectively to the first PHY unit 205 and the second PHY unit 206. The switchable signal path 230 may include a switchable digital hardware unit 231 to selectively change or adapt functions provided by the digital hardware unit 231 in the signal path and a switchable RF unit 232 to selectively change or adapt functions provided by the RF unit 232 in the signal path. The switchable digital hardware unit 231 may include separate digital circuit components that may be selectively coupled to the first PHY unit 205 or the second PHY unit 206 or it may contain multi-function digital hardware that may be usable or reconfigured for use with either PHY unit. Similarly, the switchable RF unit 232 may contain separate analog circuit components that may be selectively coupled to the first PHY unit 205 or the second PHY unit 206 or it may contain multi-function RF circuit components that may be usable or reconfigured for use with ether PHY unit.

The switchable signal path 230 may make use of hardware switches or software switches to enable the sharing of the antenna 212 between the first PHY unit 205 and the second PHY unit 206, for example. The switching of the hardware switches or the software switches in the switchable signal path 230 may occur dynamically, enabling the coupling of the antenna 212 to either the first PHY unit 205 or the second PHY unit 206 on a transmission burst (or finer) level. For example, upon a detection of a transmission or a reception by one of the two PHY units, the antenna 212 may be coupled to the PHY unit by switches in the switchable signal path 230. Alternatively, the coupling of the antenna 212 may be performed on an as needed basis, which may enable the coupling and decoupling of the antenna 212 during a transmission or reception. The dynamic switching of the switchable signal path 230 may enable the sharing of the antenna 212 between multiple PHY units.

The communications device 200 also includes a processor 240 that may be used for processing of information to be transmitted or information received over the air. Alternatively, a state machine may be used to perform the processing of the information. The processor 240 includes a switch control unit 242 that may be used to generate control signals or control values that may be used to control the switching of the switchable signal path 230. Depending on the value of the control signals or control values generated by the switch control unit 242, the switchable signal path 230 may couple the antenna 212 to either the first PHY unit 205 or the second PHY unit 206, for example. The communications device 200 may also include a memory 245 for storing information as well as application programs and a hardware interface 250 that may allow for communications with other hardware contained in or attached to the communications device 200.

The antennas 210, operating with the antenna 212, may enable the first PHY unit 205 to support a wireless communications standard permitting the transmission of up to three independent data streams and the receiving of up to three independent data streams (i.e., a 3×3 wireless communications standard). The second PHY unit 206 may support a wireless communications standard permitting the transmission of up to two independent spatial or time multiplexed data streams and the receiving of up to two independent spatial or time multiplexed data streams (i.e., wireless 2×2 MIMO communications) using the antenna 211 and the antenna 212. If fewer than three (two) independent spatial or time multiplexed data streams are used, then fewer than three (two) antennas may be used. However, if more antennas are used than independent spatial or time multiplexed data streams, the additional antennas may transmit or receive independently faded versions of some (or all) of the independent spatial or time multiplexed data streams. For example, if three antennas are used to transmit two independent spatial or time multiplexed data streams, then the one additional antenna may provide single antenna diversity. If two additional antennas are used, then the two additional antennas may provide two antenna diversity.

Therefore, the communications device 200 may be able to support the first wireless communications standard transmitting/receiving three independent spatial or time multiplexed data streams, two independent spatial or time multiplexed data streams with single antenna diversity, one data stream with two antenna diversity, two independent spatial or time multiplexed data streams, or one data stream with single antenna diversity. The communications device 200 may also be able to support the second wireless communications standard transmitting/receiving up to two independent spatial or time multiplexed data streams, one data stream with single antenna diversity, or one data stream. It is to be noted that a sum of the number of antennas used by the first wireless communications standard and the second wireless communications standard may add up to be less than or equal to the total number of antennas available in the communications device 200.

Each of signal paths coupling the antennas 210-211 to the first PHY unit 205 and the second PHY unit 206 may require its own RF unit, such as the first RF unit 220 and the second RF unit 221, and digital hardware unit, such as the first digital hardware unit 225 and the second digital hardware unit 226. Furthermore, the signal paths coupling the antenna 212 to both the first PHY unit 205 and the second PHY unit 206 may require copies of both RF units (the first RF unit 220 and the second RF unit 221) as well as both digital hardware units (the first digital hardware unit 225 and the second digital hardware unit 226) or multi-function digital hardware and RF circuit components.

It may be possible to alter the amount of hardware needed in a communications device that is capable of communicating using a number of wireless communications standards by changing a point in the communications device's signal path where a switching occurs for the sharing of a common antenna by different PHY units. For example, digital hardware may have a high level of flexibility that may enable a single set of digital hardware to be shared by different PHY units implementing different wireless communications standards. Similarly, analog hardware may be shared by different PHY units. Therefore, if the switching occurs at a first point in the signal path of the communications device, it may be possible to share a single set of digital hardware and/or RF unit between the different PHY units, while if the switching occurs at a second point in the signal path, each PHY unit may require its own set of digital hardware and RF unit, thereby potentially significantly increasing the hardware requirement of the communications device.

Figure 2B:
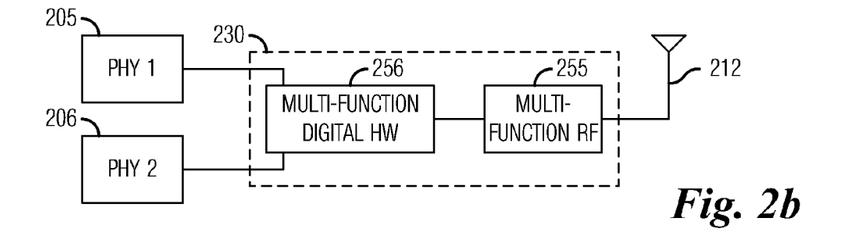
FIGS. 2b-2f illustrate detailed views of a portion of a communications device.

FIG. 2*b* illustrates a detailed view of a portion of a communications device, wherein multiple PHY units share an antenna. FIG. 2*b* illustrates the first PHY unit 205 and the second PHY unit 206 sharing the antenna 212 through switchable signal path 230. The switchable signal path 230 includes a multi-function RF unit 255 and a multi-function digital hardware unit 256. The use of the multi-function RF unit 255 and the multi-function digital hardware unit 256 may enable the use of a single RF unit and digital hardware unit to provide RF and digital functionality. The use of the multi-function RF unit 255 and the multi-function digital hardware unit 256 may allow for the switching of the switchable signal path 230 to occur at a late point in the switchable signal path 230, for example, such as at an output of a unit performing a time-frequency (or frequency time) transformation such as a Fourier (or inverse Fourier) transformation located in the multi-function digital hardware unit 256. The switching performed in the switchable signal path 230 (in the multi-function digital hardware unit 256) may be controlled by a single control signal or set of control signals.

Figure 2C:
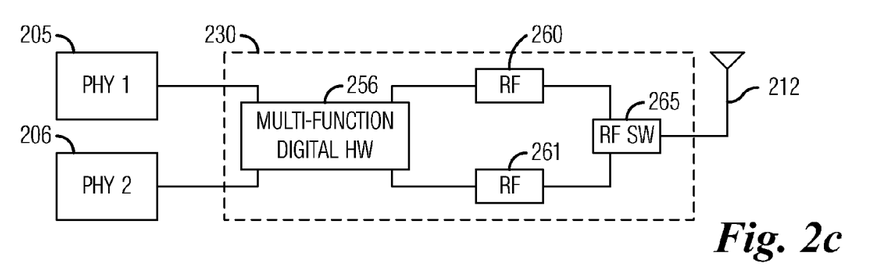

FIG. 2*c* illustrates a detailed view of a portion of a communications device, wherein multiple PHY units share an antenna. FIG. 2*c* illustrates the first PHY unit 205 and the second PHY unit 206 sharing the antenna 212 through switchable signal path 230. The switchable signal path 230 includes a multi-function digital hardware unit 256. The switchable signal path 230 also includes separate RF units 260 and 261, corresponding to the first PHY unit 205 and the second PHY unit 206. The use of separate RF units 260 and 261 may enable the use of specifically designed RF circuits, potentially resulting in improved performance, lower power consumption, smaller overall size, and so forth. The switchable signal path 230 further includes an RF switch "RF SW" 265. The RF switch 265 may selectively couple the antenna 212 to either of the separate RF units 260 and 261. The switching performed in the switchable signal path 230, including the RF switch 265 and the multi-function digital hardware unit 256, may be controlled by a single control signal or set of control signals.

Figure 2D:
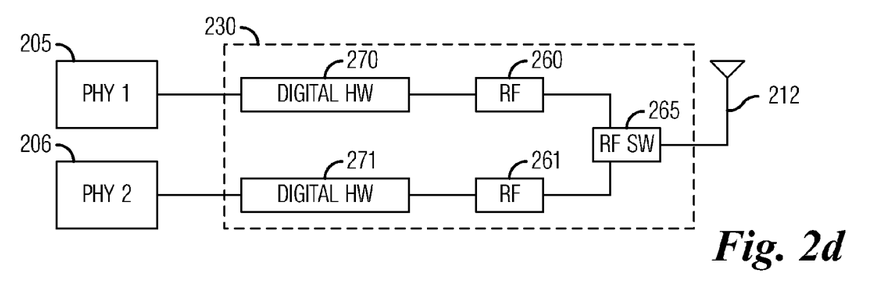

FIG. 2*d* illustrates a detailed view of a portion of a communications device, wherein multiple PHY units share an antenna. FIG. 2*d* illustrates the first PHY unit 205 and the second PHY unit 206 sharing the antenna 212 through switchable signal path 230. The switchable signal path 230 includes separate RF units 260 and 261, as well as separate digital hardware units 270 and 271. The RF units 260 and 261 and the digital hardware units 270 and 271 correspond to the first PHY unit 205 and the second PHY unit 206, respectively. The use of separate RF units 260 and 261 as well as separate digital hardware units 270 and 271 may enable the use of specifically designed circuits. The switchable signal path 230 also includes the RF switch 265 that may selectively couple the antenna 212 to either of the separate RF units and digital hardware units. The switching performed in the switchable signal path 230 (the RF switch 265) may be controlled by a single control signal or set of control signals.

Figure 2E:
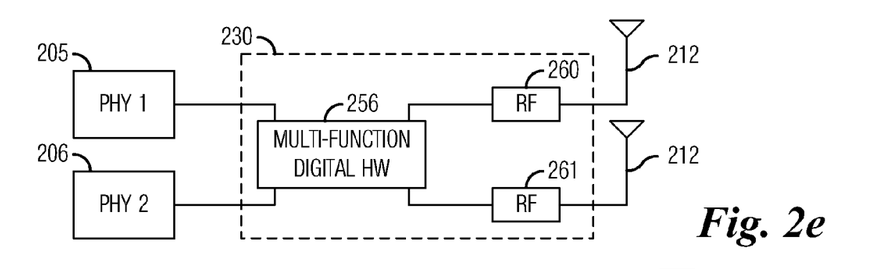

FIG. 2*e* illustrates a detailed view of a portion of a communications device, wherein multiple PHY units share multiple antennas. FIG. 2*e* illustrates the first PHY unit 205 and the second PHY unit 206 sharing multiple antennas 212 through switchable signal path 230. The switchable path 230 may allow for the coupling of the multiple antennas 212 to a single PHY unit, such as the first PHY unit 205 or the second PHY unit 206. Each of the multiple antennas 212 may have a separate RF unit 260 and 261 to enable simultaneous transmitting and/or receiving of information over the multiple antennas 212. The multi-function digital hardware unit 256 may perform necessary switching to couple the multiple antennas 212 to either the first PHY unit 205 or the second PHY unit 206. The switching performed in the switchable signal path 230 (in the multi-function digital hardware unit 256) may be controlled by a single control signal or set of control signals.

Figure 2F:
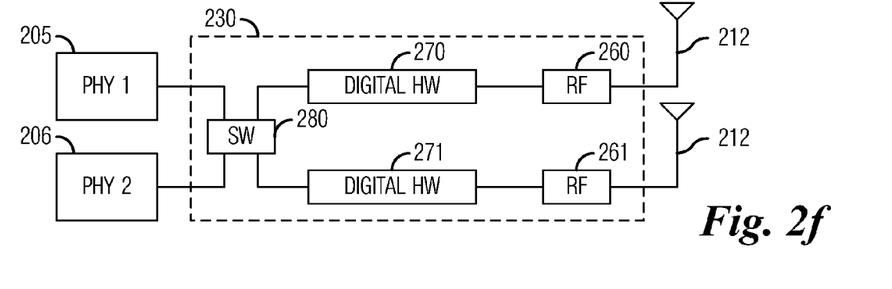

FIG. 2*f* illustrates a detailed view of a portion of a communications device, wherein multiple PHY units share multiple antennas. FIG. 2*f* illustrates the first PHY unit 205 and the second PHY unit 206 sharing multiple antennas 212 through switchable signal path 230. The switchable path 230 may allow for the coupling of the multiple antennas 212 to a single PHY unit, such as the first PHY unit 205 or the second PHY unit 206. The switchable signal path 230 includes separate digital hardware units 270 and 271 to separately process signals to be transmitted on and/or received from the multiple antennas 212. The switchable signal path 230 also includes a switch 280. The switch 280 may be used to couple the multiple antennas 212 to either the first PHY unit 205 or the second PHY unit 206. The switching performed in the switchable signal path 230 (the switch 280) may be controlled by a single control signal or a set of control signals.

Additionally, rapid switching between different PHY units may be able to reduce a total number of antennas used in the communications device 200. For wireless communications standards wherein there is a high ratio of idle (or listening) time compared to active (or actual transmitting/receiving) time, rapid switching may significantly reduce a total number of antennas needed by the different PHY units, especially when more than two different wireless communications standards (or a single wireless communications standard using more than one frequency band) are in use.

Figure 3A:
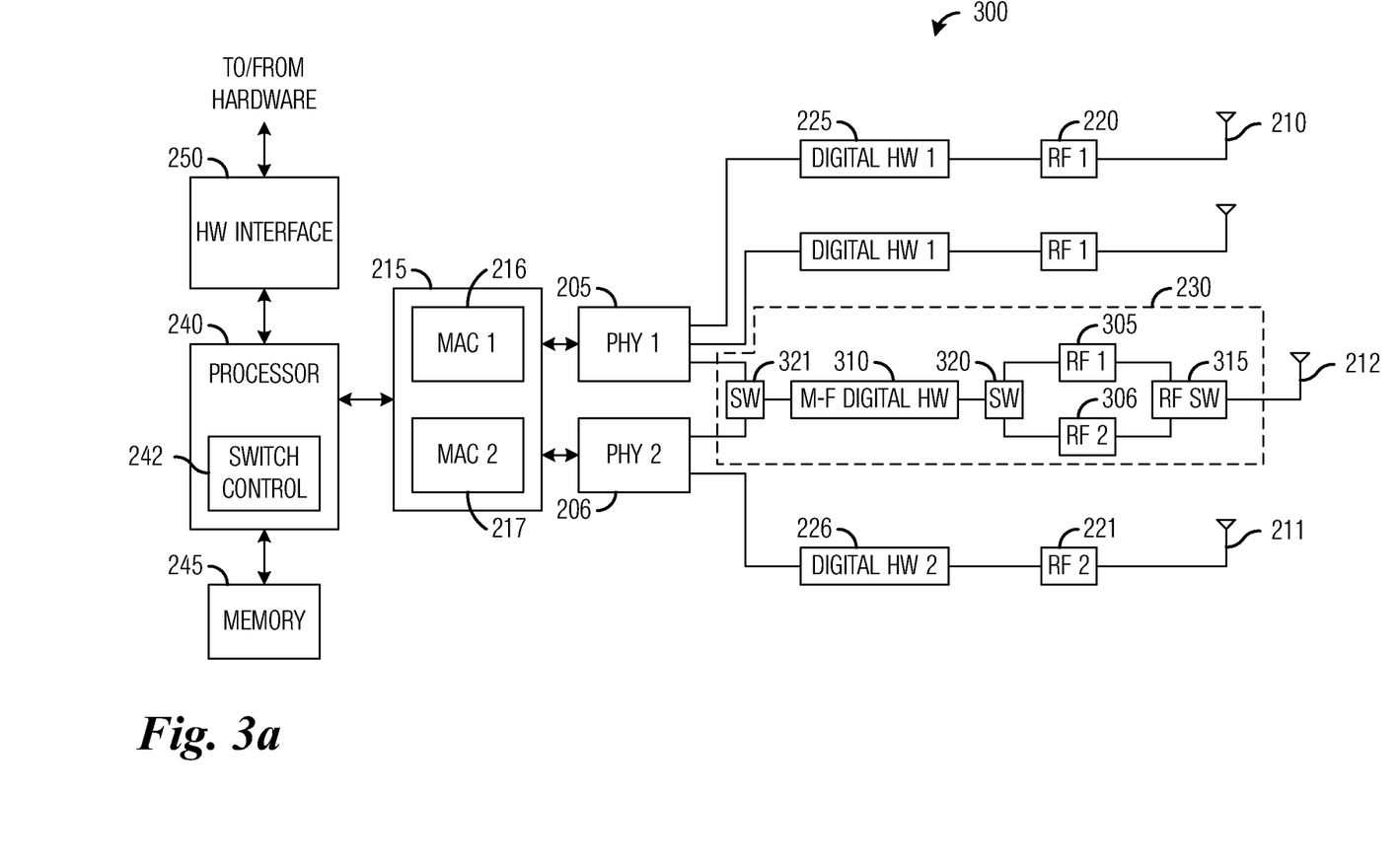
FIG. 3a is a detailed diagram of a communications device.

FIG. 3a illustrates a communications device 300, wherein the communications device 300 shares an antenna to reduce hardware requirements while providing compatibility with several wireless communications standards. The communications device 300 includes several antennas that may be logically grouped into several different antenna types. The antennas may be physically different or similar, but they may serve different functions. A first antenna may be an antenna(s) dedicated for use by the first PHY unit 205, such as antenna 210. A second antenna may be an antenna(s) dedicated for use by the second PHY unit 206, such as antenna 211. A third antenna may be an antenna(s) that may be used by either or both the first PHY unit 205 and the second PHY unit 206, such as antenna 212.

The first PHY unit 205 operating in conjunction with a MAC controller 215 implementing a first MAC unit 216 may implement a first wireless communications standard. Similarly, the second PHY unit 206 operating in conjunction with the MAC controller 215 implementing a second MAC unit 217 may implement a second wireless communications standard. Alternatively, the first PHY unit 205 and the second PHY unit 206 may implement one wireless communications standard operating in different frequency bands.

Coupled in between the antenna 210 and the first PHY unit 205 may be a combination of analog hardware, such as filters, amplifiers, mixers, analog-to-digital converters, and so forth, contained in a first RF "RF 1" unit 220, and digital hardware, such as filters, amplifiers, Fourier transforms, digital-to-analog converters, and so forth, contained in a first digital hardware "DIGITAL HW 1" unit 225. Likewise, coupled in between the antenna 211 and the second physical unit 206 may be a combination of analog hardware, such as filters, amplifiers, mixers, analog-to-digital converters, and so forth, contained in a second RF "RF 2" unit 221, and digital hardware, such as filters, amplifiers, Fourier transforms, digital-to-analog converters, and so forth, contained in a second digital hardware "DIGITAL HW 2" unit 226.

Figure 3B:
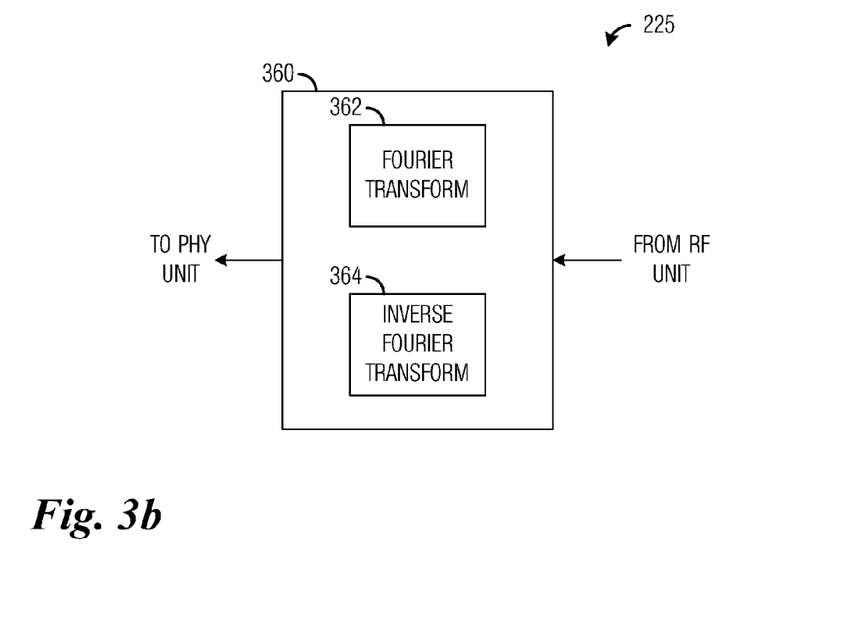
FIG. 3b is a diagram of a digital hardware unit.

FIG. 3b illustrates a detailed view of a digital hardware unit, such as the first digital hardware unit 225. The first digital hardware unit 225 includes a Fourier unit 360 that may include a Fourier transform unit 362 and an inverse Fourier transform unit 364. Although shown as having the Fourier unit 360, the digital hardware unit 225 may include other digital circuits. It may also be possible to include the digital hardware unit 225 in a PHY unit, such as the first PHY unit 205.

Figure 3C:
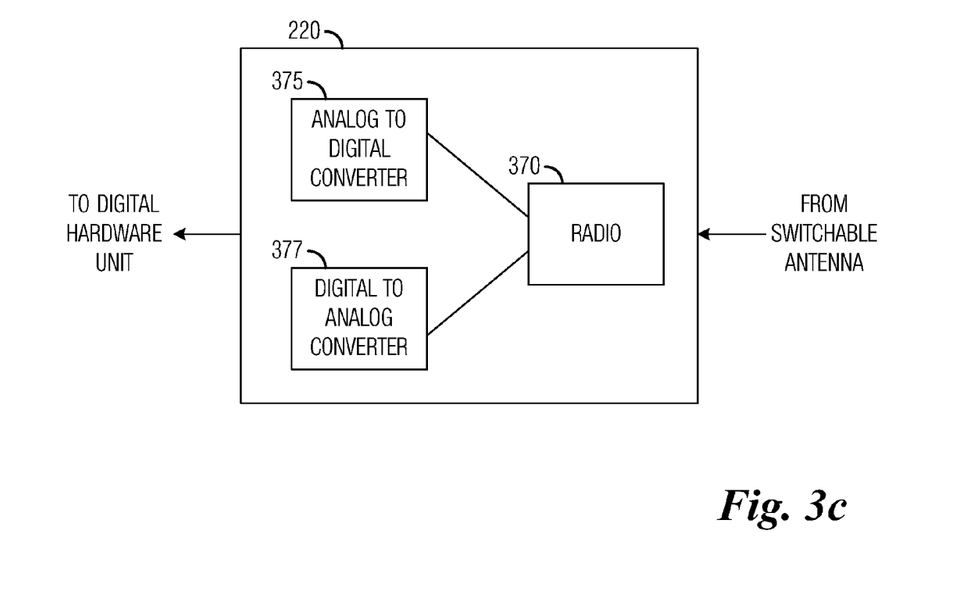
FIG. 3c is a diagram of a radio frequency (RF) unit.

FIG. 3c illustrates a detailed view of a RF unit, such as the first RF unit 220. The first RF unit 220 includes a radio 370 capable of sending and receiving RF signals according to a wireless communications standard. The first RF unit 220 also includes an analog to digital converter 375 and a digital to analog converter 377 to convert signals between digital and analog domains.

Turning back to FIG. 3a, coupled in between the antenna 212 and the first PHY unit 205 and the second PHY unit 206 may be analog and digital hardware contained in the switchable signal path 230. Examples of analog hardware may include filters, amplifiers, mixers, analog-to-digital converters, and so forth. The analog hardware may be contained in a third RF unit 305 to perform analog signal processing on radio frequency signals from or to the first PHY unit 205. The analog signal processing in the third RF unit 305 may be similar to the analog signal processing performed in the first RF unit 220 and may be a replication of the analog hardware contained in the first RF unit 220. A fourth RF unit 306, coupled in between the antenna 212 and the second PHY unit 206, may be used to perform analog signal processing on radio frequency signals from or to the second PHY unit 206. The analog signal processing in the fourth RF unit 306 may be similar to the analog signal processing performed in the second RF unit 221 and may be a replication of the analog hardware contained in the second RF unit 221.

An RF switch 315 may couple the third RF unit 305 or the fourth RF unit 306 to the antenna 212 based on a state of a control signal or control signals. In an alternative embodiment, the RF switch 315 may have a third state wherein the RF switch 315 may couple neither the third RF unit 305 nor the fourth RF unit 306 to the antenna 212. The RF switch 315 may be controlled by a control signal(s), specifying a state of the RF switch 315. A diplexer may be used in place of the RF switch 315.

Also coupled in between the antenna 212 and the first PHY unit 205 and the second PHY unit 206 may be digital hardware, such as filters, amplifiers, Fourier transforms, digital-to-analog converters, and so forth, contained in a multi-function digital hardware "M-F DIGITAL HW" unit 310. The multi-function digital hardware unit 310 may provide digital signal processing of signals from either the third RF unit 305 or the fourth RF unit 306. The digital hardware contained in the multi-function digital hardware unit 310 may be substantially similar to the digital hardware contained in the first digital hardware unit 225 and the second digital hardware unit 226.

Additional switches, such as switch 320 and switch 321, may be used to couple an output from either the third RF unit 305 or the fourth RF unit 306 to the multi-function digital hardware unit 310 and couple an output of the multifunction digital hardware unit 310 to either the first PHY unit 205 or the second PHY unit 206. In an alternative embodiment, the switches 320-321 may have an additional state that may allow the coupling of the multi-function digital hardware unit 310 to neither the third RF unit 305, the fourth RF unit 306, the first PHY unit 205, nor the second PHY unit 206. The switches 320-321 may be controlled by the same control signal(s) used to control the RF switch 315.

The use of the RF switch 315 and the switches 320-321 may enable the sharing of more than just the antenna 212 between the first PHY unit 205 and the second PHY unit 206. The multi-function digital hardware unit 310 may also be shared. This may substantially reduce the amount of hardware needed with increased antenna usage, diversity, or wireless communications standards.

The configuration of the switchable signal path 230 as shown in FIG. 3a is substantially similar to the configuration shown in FIG. 2c. The other configurations of the switchable signal path 230 shown in FIGS. 2b, 2d, 2e, and 2f, along with other configurations not shown may be used in its place. The illustration and the discussion of the configuration of the switchable signal path 230 as shown in FIG. 3a and FIG. 2c should not be construed as being limiting to either the scope or the spirit of the embodiments.

The communications device 300 also includes a processor 240 that may be used for processing of information to be transmitted or information received over the air. The communications device 300 may also include a memory 245 for storing information as well as application programs and a hardware interface 250 that may allow for communications with other hardware contained in or attached to the communications device 300.

The processor 240 may also be used to determine the value of the control signal used to control the state of the RF switch 315 and the switches 320-321. The processor 240 includes a switch control unit 242 that may be used to generate the control signal(s) to set the state of the RF switch 315 as well as the switches 320-321. The switch control unit 242 may generate the control signal on burst-by-burst basis. For example, the switch control unit 242 may generate the control signal(s) to select either the first PHY unit 205 or the second PHY unit 206 to the antenna 212 depending on which PHY unit is going to transmit or receive information. The generation of the control signal(s) on the burst-by-burst basis in combination with wireless communications standards with a high idle-to-active ratio may enable the effective sharing of antennas across multiple wireless communications standards.

Figure 4A:
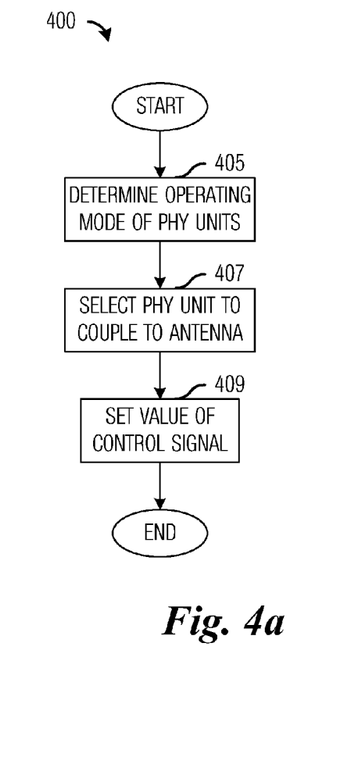
FIG. 4a is a diagram of a high-level algorithm for determining and setting a value of a control signal used to set the state of switches to couple antennas to physical (PHY) units.

FIG. 4a illustrates a high-level view of an algorithm 400 for use in determining and setting a value of a control signal(s) used to set the state of switches to couple antennas to PHY units. The algorithm 400 may be used to determine and set the value of the control signal(s) that may be used to set the state of switches, such as the RF switch 315 and the switches 320-321, used to couple antennas, such as antenna 212, to PHY units, such as the first PHY unit 205 and the second PHY unit 206. The same control signal(s) may be used to set the state of each switch or different combinations of switches may be controlled by different control signals. The algorithm 400 may execute in a processor, such as the processor 240, or a state machine, of a communications device, such as the communications device 300. More specifically, the algorithm 400 may execute in a switch control unit, such as the switch control unit 242, of the processor 240. The switch control unit 242 may continuously execute the algorithm 400 while the communications device 300 is in a normal operating mode, where the communications device 300 may be transmitting and/or receiving information.

The determining and setting of the value of the control signal(s) used to set the state of the switches to couple antennas to PHY units for use in receiving transmissions transmitted to the communications device 300 may be based on the operating mode of various PHY units in the communications device 300. Therefore, the determining and setting of the value of the control signal(s) may begin with a determining of the operating mode of the PHY units in the communications device 300 (block 405). In general, a PHY unit, such as the first PHY unit 305 or the second PHY unit 306, may be in one of several operating modes at a given moment of time. This may include a first mode that may be a LISTEN mode wherein the PHY unit may check a communications medium (electromagnetic spectrum or air interface in this case, but other communications media may also be used) for transmissions intended for the PHY unit. Depending on the wireless communications standard, a PHY unit may be in LISTEN mode if it detects a transmission of any type, even if the transmission is not intended for the PHY unit. In LISTEN mode, the PHY unit is basically idle, not transmitting or receiving. A second mode may be a TRANSMIT mode wherein the PHY unit is actively transmitting information. A third mode may be a RECEIVE mode wherein the PHY unit is actively receiving information. In some wireless communications standards, when the PHY unit is in the TRANSMIT or the RECEIVE mode, the PHY unit is busy and the number of antennas being used by the PHY unit should not be changed. However, in other wireless communications standards, it may be possible to add additional antennas or remove antennas while the PHY unit is in the TRANSMIT or the RECEIVE mode.

After the operating mode of the PHY units has been determined, a PHY unit may be selected for coupling to an antenna, such as the antenna 212 (block 407). The selection of the PHY unit may be based on the operating modes of all of the PHY units in the communications device 300, as well as other criteria, such as quality of service restrictions (QoS), traffic priority, traffic type (video, audio, telemetry information, data, and so forth), received signal strength, expected performance, data modulation-coding scheme used in respective PHY units, performance history of respective PHY units, and so forth. Once the PHY unit has been selected, the control signal may be set to a value that results in the switches being configured so that the PHY unit is coupled to the antenna 212 (block 409). Although the discussion focuses on the coupling of a single antenna to the PHY units, the embodiments may be readily extended to multiple antennas with minor modification. Therefore, the discussion of a single antenna should not be construed as being limiting to either the scope or the spirit of the embodiments.

Figure 4B:
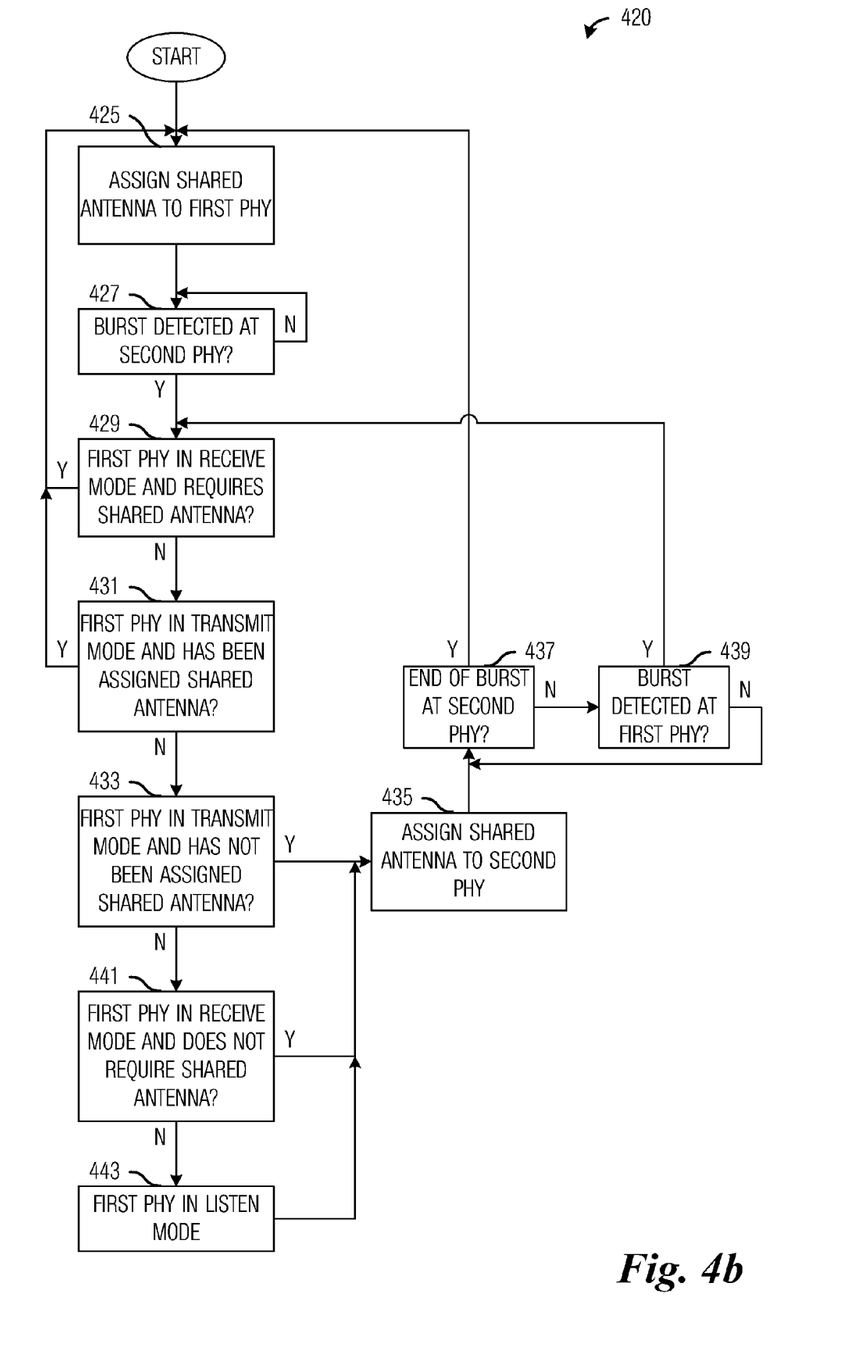
FIG. 4b is a diagram of a detailed algorithm for determining and setting a value of a control signal used to set the state of switches to couple an antenna to two PHY units.

FIG. 4b illustrates an algorithm 420 for use in determining and setting a value of a control signal(s) used to set the state of switches to couple antennas to PHY units. The algorithm 420 may be an implementation of the algorithm 400 shown in FIG. 4a. As discussed previously, the determining and setting of the value of the control signal(s) used to set the state of the switches to couple antennas to PHY units for use in receiving transmissions transmitted to the communications device 300 may be based on the operating mode of various PHY units in the communications device 300. Therefore, the determining and setting of the value of the control signal may be based on an operating mode of various PHY units in the communications device 300. The discussion herein focuses on the communications device 300 having two PHY units, the first PHY unit 205 and the second PHY unit 206, and a single antenna that may be switched between the two PHY units, the antenna 212. However, the embodiments may be applicable to communications devices having more than two PHY units and more than one antenna that may be switched between the PHY units. The extension of the embodiments to more than two PHY units and more than one antenna that may be switched between the PHY units is considered to be obvious to those of ordinary skill in the art of the invention and will not be discussed in detail herein.

The determining and setting of the value of the control signal(s) may begin by assigning the antenna 212 to a default PHY unit (block 425). The default PHY unit may be a PHY unit of a communications device selected for assignment in situations wherein no antenna assignment has been made. The default PHY unit may be selected a priori, but may be changed based on factors such as data type and priority, signal strength, operating conditions, and so forth. With the default PHY unit selected, if the antenna 212 is not specifically assigned to a PHY unit, then the antenna 212 may be assigned to the default PHY unit. For example, the default PHY unit may be the first PHY unit 205.

With the assignment of the default PHY unit made, the determining and setting of the value of the control signal(s) may wait until a transmission burst has been detected at the second PHY unit 206 (block 427). A transmission burst may comprise a PHY unit, such as the second PHY unit 206, preparing to transmit information. Alternatively, a transmission burst may comprise the second PHY unit 206 detecting a transmission on a communications medium (whether or not the transmission is intended for the second PHY unit 206). Until a transmission burst has been detected at the second PHY unit 206, there may not be a need to change the assignment of the antenna 212.

When the second PHY unit 206 detects a transmission burst, several checks may be made to determine the assignment of the antenna 212. A first check may be to determine if the first PHY unit 205 (or the default PHY unit assignment) is operating in RECEIVE mode and requires the antenna 212 (block 429). If the first PHY unit 205 is in RECEIVE mode and requires the antenna 212 to provide antenna diversity or to receive an independently faded transmission, for example, then the antenna 212 may be assigned to the first PHY unit 205 (block 425).

If the first PHY unit 205 is not in RECEIVE mode and does not require the antenna 212, then a second check may be performed to determine if the first PHY unit 205 is in TRANSMIT mode and the antenna 212 is required to transmit an independent data stream (block 431). If the first PHY unit 205 is in TRANSMIT mode and the antenna 212 is required to transmit an independent data stream, then the antenna 212 may be assigned to the first PHY unit 205 (block 425).

If the first PHY unit 205 is not in TRANSMIT mode and the antenna 212 is not required to transmit an independent data stream, then a third check may be performed to determine if the first PHY unit 205 is in TRANSMIT mode and the antenna 212 is not required (block 433). If the first PHY unit 205 is in TRANSMIT mode and the antenna 212 is not required, then the antenna 212 may be assigned to the second PHY unit 206 (block 435).

After assigning the antenna 212 to the second PHY unit 206, a check may be made to determine if the transmission burst at the second PHY unit 206 has ended (block 437). If the transmission burst at the second PHY unit 206 has ended, then the antenna 212 may be reassigned to the first PHY unit 205 (block 425). If the transmission burst at the second PHY unit 205 has not ended, then another check may be made to determine if a transmission burst has been detected at the first PHY unit 205 (block 439).

If a transmission burst has not been detected at the first PHY unit 205, then the antenna 212 may remain assigned to the second PHY unit 206. However, if a transmission burst has been detected at the first PHY unit 205, then it may be necessary to reassign the antenna 212 based on factors such as data type and priority, signal strength, operating conditions, and so forth. The necessity of reassigning the antenna 212 may be determined by re-executing a series of checks to determine the assignment of the antenna 212. This may be accomplished by returning to block 429.

The reassignment of the antenna 212 may result in the removal or addition of the antenna 212 to a PHY unit that may be actively receiving or transmitting. In general, it may be easier to remove the antenna 212 from a PHY unit that is actively receiving. Removing or adding the antenna 212 for a PHY unit that is actively transmitting or adding the antenna 212 for a PHY unit that is actively receiving may require additional processes, since changing the number of antennas may require a retraining of circuitry used in the transmitting or receiving. For example, in wireless communications standards that do not require training or trains frequently, the changing the number of antennas may be as simple as changing the number of antennas or waiting until a training period occurs and then changing the number of antennas prior to the training period.

Figure 5:
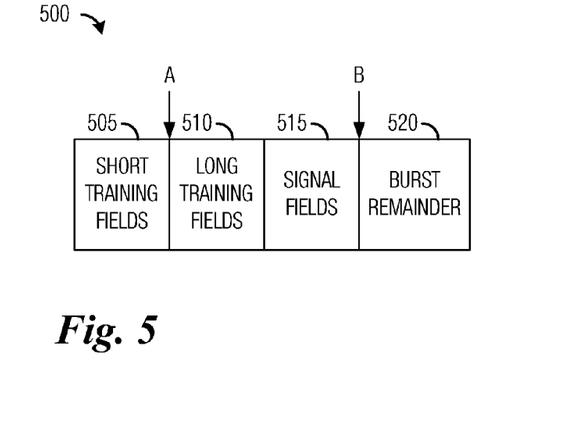
FIG. 5 is a diagram of a transmission burst.

FIG. 5 illustrates a high-level view of a transmission burst 500 of an IEEE 802.11N compliant wireless communications network. The transmission burst 500 of an IEEE 802.11N compliant wireless communications network comprises four units: a first unit 505 contains short training fields, a second unit 510 contains long training fields, a third unit 515 contains signal fields, and a fourth unit 520 contains any remaining information. The short training fields contained in the first unit 505 may be used to train receiver gain and the long training fields contained in the second unit 510 may be used to compute an estimate of the communications channel. The signal fields in the third unit 515 contain modulation and coding information and may be used to allow the receiver to determine modulation-coding scheme used in the transmission burst 500.

After having received the first unit 505 (shown as point "A") the receiver may be able to determine a measure of the signal quality of the transmission burst 500. After having received the third unit 515 (shown as point "B") the receiver may be able to determine a modulation-coding scheme used in the transmission burst 500.

Turning back to FIG. 4b, if the first PHY unit 205 is not in TRANSMIT mode and the antenna 212 has not been assigned to the first PHY unit 205, then a fourth check may be performed to determine if the first PHY unit 205 is in RECEIVE mode and does not require the antenna 212 (block 441). If the first PHY unit 205 is in RECEIVE mode and does not require the antenna 212, then the antenna 212 may be assigned to the second PHY unit 206 (block 435). After the assignment of the antenna 212 to the second PHY unit 206, the determining and setting of the value of the control signal(s) may wait until the transmission burst at the second PHY unit 206 completes (block 437) with checks for the detection of a transmission burst at the first PHY unit 205 (block 439).

If the first PHY unit 205 is not in RECEIVE mode and the first PHY unit 205 does not require the antenna 212, then the first PHY unit is in LISTEN mode (block 443) and does not need the antenna 212. Therefore, the antenna 212 may be assigned to the second PHY unit 206 (block 435). After the assignment of the antenna 212 to the second PHY unit 206, the determining and setting of the value of the control signal(s) may wait until the transmission burst at the second PHY unit 206 completes (block 437) with checks for the detection of a transmission burst at the first PHY unit 205 (block 439).

The algorithm 420 may specify the assignment of the antenna 212 on a change in operating mode of PHY units, meaning that it may be possible to reassign the antenna 212 in the middle of a transmission burst. It may be possible to simplify the assignment of the antenna 212 by restricting changes to the assignment of the antenna 212 to occur at the beginning and/or end of transmission bursts.

Figure 4C:
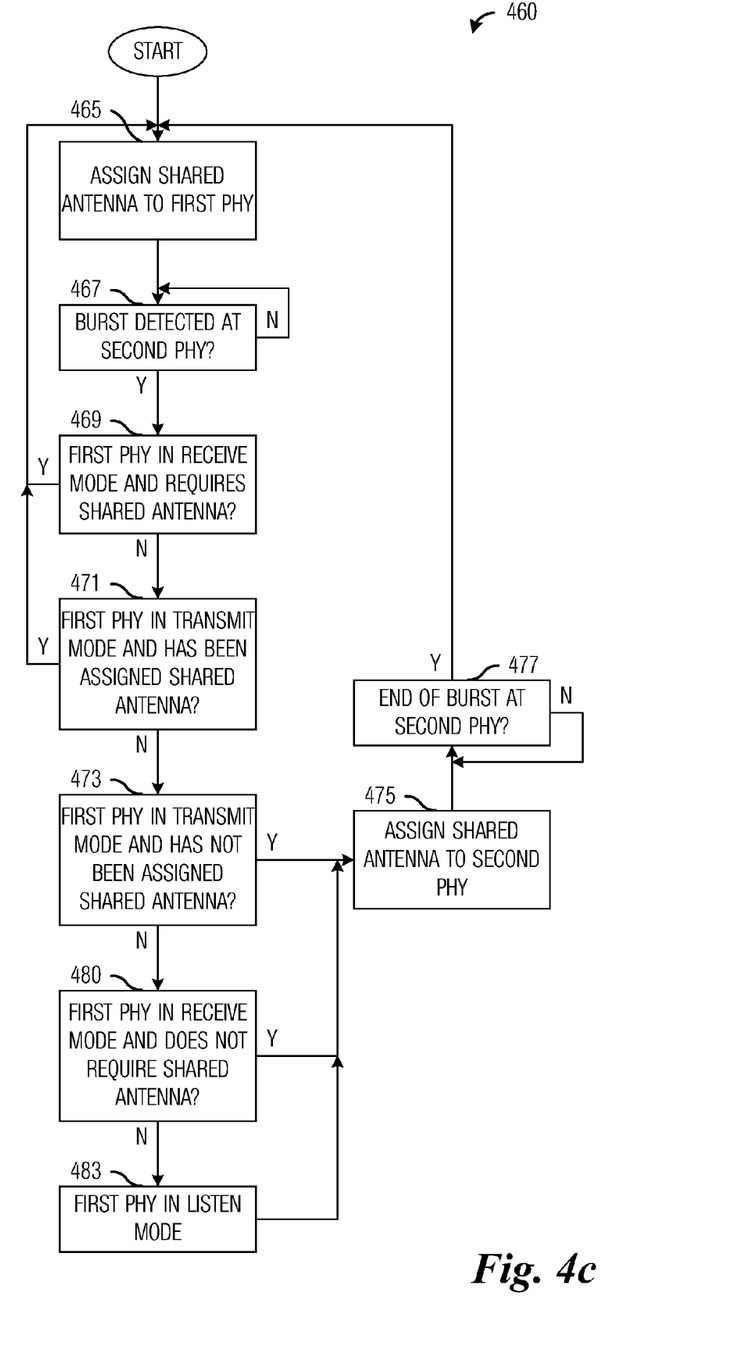
FIG. 4c is a diagram of a detailed algorithm for determining and setting a value of a control signal used to set the state of switches to couple an antenna to two PHY units of a communications device communicating using one or more IEEE 802.11 wireless communications standards.

FIG. 4c illustrates an algorithm 460 for use in determining and setting a value of a control signal(s) used to set the state of switches to couple antennas to PHY units, wherein the algorithm 460 restricts the setting of the value of the control signal(s) to occur at the beginning and/or end of transmission bursts. The algorithm 420 may be an implementation of the algorithm 400 shown in FIG. 4a. The discussion herein focuses on the communications device 300 having two PHY units, the first PHY unit 205 and the second PHY unit 206, and a single antenna that may be switched between the two PHY units, the antenna 212. However, the embodiments may be applicable to communications devices having more than two PHY units and more than one antenna that may be switched between the PHY units. It is apparent to those skilled in the art that the embodiments may be extended to more than two PHY units and/or more than one antenna that may be switched between the PHY units which will not be further discussed in detail herein.

The determining and setting of the value of the control signal(s) may begin by assigning the antenna 212 to a default PHY unit assignment (block 465). To help simplify the assignment of the antenna 212, a default PHY unit assignment may be made. With the default PHY unit assignment, if the antenna 212 is not specifically assigned to a PHY unit, then the antenna 212 may be assigned to a default PHY unit.

For example, the default PHY unit may be the first PHY unit 205. The default PHY unit may be assigned a priori, but may be changed based on factors such as data type and priority, signal strength, operating conditions, and so forth.

With the default PHY unit assignment made, the determining and setting of the value of the control signal(s) may wait until a transmission burst has been detected at the second PHY unit 206 (block 467). A transmission burst may comprise a PHY unit, such as the second PHY unit 206, preparing to transmit information. Alternatively, a transmission burst may comprise the second PHY unit 206 detecting a transmission on a communications medium (whether or not the transmission is intended for the second PHY unit 206). Until a transmission burst has been detected at the second PHY unit 206, there may not be a need to change the assignment of the antenna 212.

When the second PHY unit 206 detects a transmission burst, several checks may be made to determine the assignment of the antenna 212. A first check may be to determine if the first PHY unit 205 (or the default PHY unit assignment) is operating in RECEIVE mode and requires the antenna 212 (block 469). If the first PHY unit 205 is in RECEIVE mode and requires the antenna 212 to provide antenna diversity or to receive an independently faded transmission, for example, then the antenna 212 may be assigned to the first PHY unit 205 (block 465).

If the first PHY unit 205 is not in RECEIVE mode and does not require the antenna 212, then a second check may be performed to determine if the first PHY unit 205 is in TRANSMIT mode and the antenna 212 is required to transmit an independent data stream (block 471). If the first PHY unit 205 is in TRANSMIT mode and the antenna 212 is required to transmit an independent data stream, then the antenna 212 may be assigned to the first PHY unit 205 (block 465).

If the first PHY unit 205 is not in TRANSMIT mode and the antenna 212 is not required to transmit an independent data stream, then a third check may be performed to determine if the first PHY unit 205 is in TRANSMIT mode and the antenna 212 is not required (block 473). If the first PHY unit 205 is in TRANSMIT mode and the antenna 212 is not required, then the antenna 212 may be assigned to the second PHY unit 206 (block 475).

After assigning the antenna 212 to the second PHY unit 206, a check may be made to determine if the transmission burst at the second PHY unit 206 has ended (block 477). If the transmission burst at the second PHY unit 206 has ended, then the antenna 212 may be reassigned to the first PHY unit 205 (block 465).

If the first PHY unit 205 is not in TRANSMIT mode and the antenna 212 has not been assigned to the first PHY unit 205, then a fourth check may be performed to determine if the first PHY unit 205 is in RECEIVE mode and does not require the antenna 212 (block 480). If the first PHY unit 205 is in RECEIVE mode and does not require the antenna 212, then the antenna 212 may be assigned to the second PHY unit 206 (block 475). After the assignment of the antenna 212 to the second PHY unit 206, the determining and setting of the value of the control signal(s) may wait until the transmission burst at the second PHY unit 206 completes (block 477).

If the first PHY unit 205 is not in RECEIVE mode and the first PHY unit 205 does not require the antenna 212, then the first PHY unit is in LISTEN mode (block 483) and does not need the antenna 212. Therefore, the antenna 212 may be assigned to the second PHY unit 206 (block 475). After the assignment of the antenna 212 to the second PHY unit 206, the determining and setting of the value of the control signal(s) may wait until the transmission burst at the second PHY unit 206 completes (block 477).

While herein the term access point is used, it is to be noted that this term is not intended to be restricted to pure WLAN access points but also other base stations of other communication techniques and modes.

Although the embodiments have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communications device comprising:
   a first physical layer (PHY) unit, the first PHY unit configured to transmit or receive data based on a first wireless communications specification;
   a second PHY unit, the second PHY unit configured to transmit or receive data based on a second wireless communications specification;
   a first signal path coupled to a first antenna and to the first PHY unit, the first signal path configured to perform processing on a signal in the first signal path;
   a second signal path coupled to a second antenna and to the second PHY unit, the second signal path configured to perform processing on a signal in the second signal path; and
   a switchable signal path coupled to a third antenna and switchably coupled to the first PHY unit and to the second PHY unit, the switchable signal path configured to perform processing on a signal in the switchable signal path and to switchably couple the third antenna to either the first PHY unit or the second PHY, wherein the first PHY, the second PHY, the first signal path, the second signal path, and the switchable signal path are disposed in the communications device.

2. The communications device of claim 1, wherein the first wireless communications specification and the second wireless communications specification comprise one wireless communications specification utilizing different frequency bands.

3. The communications device of claim 1, wherein the first signal path comprises a first analog hardware unit to perform analog signal processing on the signal in the first signal path.

4. The communications device of claim 3, wherein the first signal path further comprises a first digital hardware unit to perform digital signal processing on the signal in the first signal path.

5. The communications device of claim 1, wherein the switchable signal path comprises a multi-function analog hardware unit coupled to the third antenna, the multi-function analog hardware unit configured to perform analog signal processing on the signal in the switchable signal path according to either the first wireless communications specification or the second wireless communications specification.

6. The communications device of claim 5, wherein the switchable signal path further comprises a multi-function digital hardware unit coupled to the multi-function analog hardware unit, the multi-function digital hardware unit configured to perform digital signal processing on the signal in the switchable signal path according to either the first wireless communications specification or the second wireless communications specification.

7. The communications device of claim 1, wherein communications device is configurable to support the first wireless communications specification according to the following technique:
three independent spatial or time multiplexed data streams, or
two independent spatial or time multiplexed data streams with one antenna for diversity, or
one spatial or time multiplexed data stream with one antenna for diversity and one spatial or time multiplexed data stream, or
one spatial or time multiplexed data stream with two antennas for diversity, or
one spatial or time multiplexed data stream, or
two independent spatial or time multiplexed data streams, and wherein the communications device is configurable to support the second wireless communications specification according to following techniques:
two independent spatial or time multiplexed data streams, or
one spatial or time multiplexed data stream with one antenna for diversity, or
one spatial or time multiplexed data stream.

8. The communications device of claim 1, wherein the communications device is configured to dynamically switch the switchable signal path based on detected parameters related to an operation mode of the communications device.

9. The communications device of claim 1, further comprising a switch control unit coupled to the third antenna, the switch control unit configured to generate a control signal for coupling of the third antenna to either the first PHY unit or the second PHY unit.

10. The communication device of claim 1, wherein the switchable signal path comprises a first switchable signal path and a second switchable signal path, the first switchable signal path coupled between the third antenna and the first PHY unit and the second switchable signal path coupled between the third antenna and the second PHY unit.

11. The communication device of claim 1, wherein the communication device comprises an access point.

12. An access point comprising:
a first physical layer (PHY) unit configured to transmit or receive data over a first wireless communications network;
a first antenna connected to the first PHY unit;
a second PHY unit different from the first PHY unit and configured to transmit or receive data over a second wireless communications network;
a second antenna connected to the second PHY unit; and
a switchable antenna connected either to the first PHY or the second PHY, the switchable antenna configured to transmit or receive data according to the first wireless communications network or the second wireless communications network,
wherein the access point is a single device configured to be operated in a network.

13. The access point of claim 12, wherein the first antenna comprises a plurality of first antennas.

14. The access point of claim 13, wherein the second antenna comprises a plurality of second antennas.

15. The access point of claim 12, wherein the switchable antenna comprises a plurality of switchable antennas.

16. The access point of claim 12, further comprising a processor coupled to the first PHY unit, and to the second PHY unit, the processor configured to process information to be transmitted or information received and to assign the switchable antenna to either the first PHY unit or the second PHY unit, the processor comprising a switch control unit coupled to the switchable antenna, the switch control unit configured to generate a control signal to specify the coupling of the switchable antenna to either the first PHY unit or the second PHY unit.

17. The access point of claim 12, further comprising a first signal path between the first antenna and the first PHY unit, and a second signal path between the second antenna and the second PHY unit, the first signal path configured to perform first analog and digital processing on a signal in the first signal path and the second signal path configured to perform second analog and digital processing on a signal in the first signal path.

18. The access point of claim 17, further comprising a switchable signal path between the first PHY and switchable antenna or the second PHY and the switchable antenna.

19. The access point of claim 18, wherein the switchable signal path includes a multi-function digital hardware unit and a multi-function RF unit.

20. The access point of claim 18, wherein the switchable signal path includes a multi-function digital hardware unit and separate RF units.

21. The access point of claim 18, wherein the switchable signal path includes separate digital hardware units and separate RF units.

22. An access point comprising:
a plurality of different physical layer (PHY) units, each PHY unit configured to be in a listen mode, a receive mode, or a transmit mode;
a plurality of antennas, each PHY unit connected to an antenna of the plurality of antennas;
a switchable antenna, the switchable antenna switchably connected to the plurality of PHY units; and
a processor unit configured to determine an operation mode of each PHY unit and configured to connect a selected PHY unit to the switchable antenna, wherein the selected PHY unit is selected in response to determining that,
the selected PHY unit is in the receive mode and the selected PHY unit requires the switchable antenna, or
the selected PHY unit is in the transmit mode and the selected PHY unit has been assigned the switchable antenna, or
another PHY unit is in the transmit mode and the selected PHY unit has not been assigned the switchable antenna, or
another PHY unit is in the receive mode and the other PHY unit does not require the switchable antenna, or
the selected PHY unit is in the listen mode,
wherein the access point is a single device configured to be operated in a network.

23. The access point of claim 22, wherein the processor unit is configured to select a default PHY unit prior to determine the operating mode.

24. The access point of claim 23, wherein the default PHY unit is selected based on a series of criteria, and wherein the series of criteria includes one or more of the following: quality of service restrictions, traffic priority, traffic type, received signal strength, expected performance, data modulation-coding scheme, and performance history.

25. The access point of claim 22, wherein the processor unit is configured to repeat a selection and an application each time the selected PHY unit or the another PHY unit transmits or receives.

26. A communication network comprising:
a first communication device;
a second communication device; and
an access point being a single device in the communication network, the access point comprising:
   a first physical layer (PHY) unit configured to transmit or receive data over a first wireless communication network;
   a first antenna connected to the first PHY unit;
   a second PHY unit configured to transmit or receive data over a second wireless communication network;
   a second antenna connected to the second PHY unit; and
   a switchable antenna connected either to the first PHY or the second PHY, the switchable antenna configured to transmit or receive data according to the first wireless communication network or the second wireless communication network.

27. The communication network of claim 26, wherein the first wireless communication network is configured to operate in a first multiple input multiple output (MIMO) mode and wherein the second wireless communication network is configured to operate in a second MIMO mode.

* * * * *